(12) United States Patent
Prasad et al.

(10) Patent No.: US 11,500,560 B2
(45) Date of Patent: Nov. 15, 2022

(54) METHOD TO SUGGEST BEST SCM CONFIGURATION BASED ON RESOURCE PROPORTIONALITY IN A DE-DUPLICATION BASED BACKUP STORAGE

(71) Applicant: EMC IP Holding Company LLC, Hopkinton, MA (US)

(72) Inventors: Parmeshwr Prasad, Bangalore (IN); Rahul Deo Vishwakarma, Kolkata (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 12 days.

(21) Appl. No.: 17/152,371

(22) Filed: Jan. 19, 2021

(65) Prior Publication Data

US 2022/0229570 A1   Jul. 21, 2022

(51) Int. Cl.
*G06F 12/08* (2016.01)
*G06F 3/06* (2006.01)

(52) U.S. Cl.
CPC ............ *G06F 3/0632* (2013.01); *G06F 3/061* (2013.01); *G06F 3/0659* (2013.01); *G06F 3/0673* (2013.01)

(58) Field of Classification Search
CPC .... G06F 3/0659; G06F 3/0689; G06F 3/0653; G06F 12/08; G06F 12/0868; G06F 2212/1024; G06F 2212/261; G06F 3/061; G06F 3/0676; G06F 3/0611; G06F 12/0804; G06F 12/0866; G06F 2212/502; G06F 2212/6026; G06F 3/064
See application file for complete search history.

(56) References Cited

U.S. PATENT DOCUMENTS

2015/0261438 A1*  9/2015  Nagaraj .............. G06F 12/0868
                                                          711/113

* cited by examiner

*Primary Examiner* — Yong J Choe
(74) *Attorney, Agent, or Firm* — Workman Nydegger (57) ABSTRACT

One example method includes defining a configuration of SCM, receiving a stream of IOs from a client, analyzing the stream of IOs and, based on the analyzing, estimating future IO behavior of the client, and based on estimated future IO behavior of the client, reconfiguring one or more parameters of the configuration of the SCM to define an updated configuration of the SCM, and the updated configuration of the SCM enables an improvement in IO performance relative to an IO performance of the configuration of the SCM.

20 Claims, 9 Drawing Sheets

```
[root@localhost ~]# ndctl list
[
  {
    "dev":"namespace0.0",
    "mode":"sector",
    "size":10725863424 ,
    "uuid":"72bf4266-2c74-440b-a5af-063ed26be580" ,
    "sector_size":4096,
    "blockdev":"pmem0s"
  {
]
```

FIG. 7A — 702

```
[root@localhost ~]# ndctl create-namespace -f -e namespace0.0 --mode=devax -s 20G
{
  "dev":"namespace0.0",
  "mode":"devdax",
  "map":"dev"
  "size":"19.69 GiB (21.14 GB)",
  "uuid":"ca7d21f5-a620-416c-83e6-bdb899e9c758",
  "daxregion":{
    "id":0,
    "size":"19.69 GiB (21.14 GB)",
    "align":2097152,
    "devices":[
      {
        "chardev":"dax0.0",
        "size":"19.69 GiB (21.14 GB)",
        "target_node":2,
        "mode":"devdax"
      }
    [
  },
  "align":2097152
}
```

METHOD TO SUGGEST BEST SCM CONFIGURATION BASED ON RESOURCE PROPORTIONALITY IN A DE-DUPLICATION BASED BACKUP STORAGE

FIELD OF THE INVENTION

Embodiments of the present invention generally relate to storage class memory (SCM) such as may be employed in a backup storage environment. More particularly, at least some embodiments of the invention relate to systems, hardware, software, computer-readable media, and methods for generating, and employing, an SCM configuration that may be optimally suited for a particular set of operating parameters.

BACKGROUND

The combination of low latency, byte-addressability, persistence, and large capacity make persistent memory (SCM) an attractive alternative. However, SCM must be configured in the right way for optimal performance. System administrators typically lack the capability to define and implement such configurations. This is due to the fact that effectively employing SCM in a specific environment is a challenging task which may be required to account for parameters such as the type and volume of incoming IOs, the system configuration, and data block size, for example.

While some tools exist that may help in the configuration of SCM, such tools are lacking in functionality. For example such tools cannot set parameters such as the correct block size, or the correct block size based on IO depth. As well, typical tools are unable to set sub-parameters to boost bandwidth, or sub-parameters to reduce read/write latency. Finally, it can be difficult to choose the right goal, interleave, pooling, and namespace configuration, when configuring SCM.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to storage class memory (SCM) such as may be employed in a backup storage environment that may, or may not, employ deduplication systems and processes. More particularly, at least some embodiments of the invention relate to systems, hardware, software, computer-readable media, and methods for generating, and employing, an SCM configuration that may be optimally suited for a particular set of operating parameters.

In general, example embodiments of the invention may embrace periodic benchmarking of persistent memory IOPs (Input/Output Operations), latency, and bandwidth, with respect to different SCM modes. The benchmarking data may change as the SCM ages. As well, example embodiments may analyze incoming data from network traces from clients and estimate future IO (Input/Output) behavior. Such analyses may be performed, for example, using Markov Transition State, although other techniques may alternatively be used. Example embodiments may use information concerning client IO behavior to reconfigure the SCM parameters so that the SCM configuration is best suitable for the particular client IO pattern. The same, or a similar, approach may be employed with respect to subsequent time intervals. For example, and with respect to the next time interval, an embodiment may observe the future IO behavior and re-purpose the persistent memory namespace configurations in accordance with the resources proportional to clients and their IO needs.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the configuration of SCM may be tailored to a particular set of parameters, and thereby may facilitate achievement of minimized latency of IOs, such as storage reads and writes for example, with which that configuration is employed. Various other advantageous aspects of one or more example embodiments will be apparent from this disclosure.

It is noted that embodiments of the invention, whether claimed or not, cannot be performed, practically or otherwise, in the mind of a human. In connection with the illustrative examples disclosed herein, embodiments of the invention are applicable to, and find practical usage in, environments in which large numbers of client IOs, such as thousands, tens of thousands, hundreds of thousands (see, e.g., FIG. 6 which discloses processes involving 140K IOPs), or millions, or more, for example, may be handled and processed by a data storage system in a relatively short time period, such as only a few seconds. Such handling and processing is well beyond the mental capabilities of any human to perform practically, or otherwise. Thus, while simplistic examples are disclosed herein, such as examples involving only a single read operation, or a single write operation, those are only for the purpose of illustration and to simplify the discussion. As noted above, real world applications typically involve large numbers of IOs. Accordingly, nothing herein should be construed as teaching or suggesting that any aspect of any embodiment of the invention could or would be performed, practically or otherwise, in the mind of a human.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data operations. Such data operations may include, but are not limited to, data read/write/delete operations, data storage operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing data storage platforms, examples of which include the Dell-EMC DataDomain platform and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Aspects of Some Example Embodiments

Figure 1:
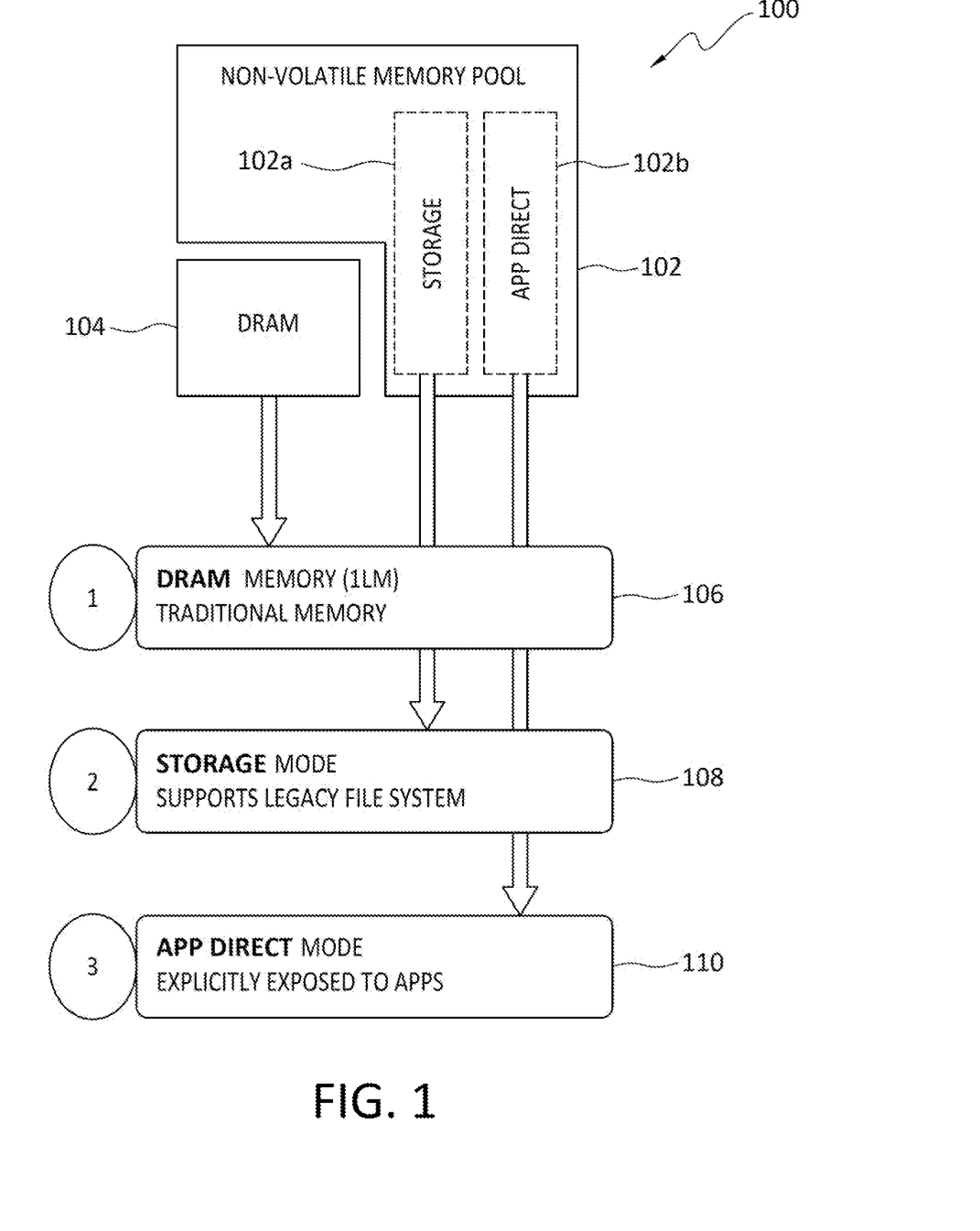
FIG. 1 discloses aspects of an example SCM configuration and associated IO modes.
Figure 2:
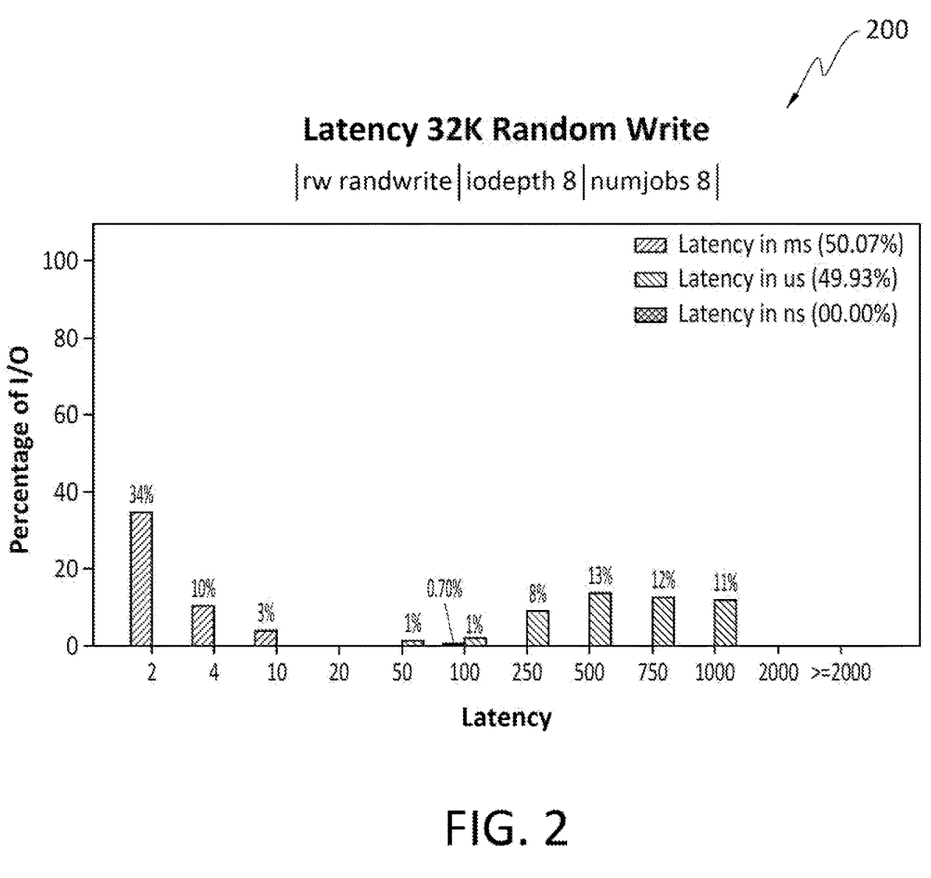
FIGS. 2, 3, 4, and 5, disclose different latencies experienced with writes of various sizes.

With reference now to FIG. 1, an example SCM configuration 100 is disclosed that may comprise, and/or enable access to, various types of memory and storage. Some, or all, of the memory and/or storage may be non-volatile in nature. That is, such non-volatile memory and/or storage may persistently store data and metadata. Thus, the example SCM configuration 100 may comprise a non-volatile memory (NVM) pool 102, along with dynamic random access memory (DRAM) 104, although other memory and/or storage types may additionally, or alternatively, be employed. The storage and/or memory included in an SCM configuration may collectively support operations in various modes including, but not limited to, memory mode 106, storage mode 108, and 'App-Direct' mode 110. In the illustrated example, the DRAM 104 may operate in the memory mode 106, while memory elements 102a and 102b of the NVM pool 102 may operate, respectively, in the storage mode 108, and the 'App-Direct' mode 110. Not all memory and storage entities of the SCM configuration 100 need operate at the same time, although they may.

In general, as client IOs, such as read, write, or delete, operations for example, come in to the SCM configuration 100, those IOs may be serviced by particular memory or storage components operating in particular operational modes. The SCM may be reconfigured to perform in these modes by changing different parameters relating to the client IOs, such as sector size, mapping, alignment (2 k, 4 k), devdax (device direct access), fsdax (filesystem direct access), and size of the associated namespace, for example. It may be useful to perform such SCM configurations based in part on the various layers through which client IOs may have to pass.

For example, and assuming that an SCM is provided in an IO path between a client and data storage and/or memory, the IO data may pass through various different layers such as PMEM aware filesystem, BTT (Block Translation Layer) (may be used for 'storage' mode) driver, MMU mapping, and a hardware layer, for example. Each layer imposes some latency on the IO, that is, performance of the client IO is slowed by the latency, or delay, imposed by a layer as the IO passes through that layer. The imposed latency may vary from one layer to another. Because the individual, and/or aggregate, imposed latency on an IO may be considerable, it may be desirable to reduce the imposed latency as much as possible so as to improve IO performance, that is, the speed with which IOs are performed.

While a particular operating environment may comprise multiple layers, it may be the case that not all of the layers are required, or involved, in performance of that IO. Rather, the characteristics of some layers may be such that those layers work better than other layers in particular SCM configurations such as, for example, SCM configurations based on read type, write type, or block size, for example. Thus, not all layers are necessarily implicated, or employed, in all SCM configurations.

To illustrate, SCM supported block sizes may be 512, 520, 528, 4096, 4160 4228, where it supports SSD attributes. All these supported block sizes may have their own merits, and de-merits, along with performance. Moreover, all of the writes of such blocks may not necessarily be persistent in nature. As well, data streams including such blocks may be kept in different caches between CPU and memory. Finally, commands such as CLFLUSH, CLWB, and CLFLUSHOPT instructions, may be employed to make all the writes persistent. In this example, then, such commands should be optimally employed to facilitate improved data storage system performance.

With reference next to FIGS. 2-6, embodiments of the invention may employ SCM benchmarking data in order to facilitate definition and implementation of SCM configurations suited to one or more particular types of IOs and/or IO parameters. Such SCM benchmarking data may be collected by any suitable method(s). In some embodiments, a flexible I/O tester (FIO) may be used to collect SCM configuration by spawning several threads, or processes, that perform a particular type of IO action, as specified by a particular SCM configuration. In the examples of FIG. 2-6, various write operations are indicated. These write operations may be simulated based on various different SCM configurations, and the SCM configurations may specify, for example, IO block sizes, IO depth, and randomness of the IOs.

Various inferences may be drawn from SCM benchmarking data such as is disclosed in the examples of FIGS. 2-5. For example, an FIO tester may gather data indicating, for a 1K random IO when iodepth is 8, that, 40% of the IO has 20 us latency, the latency gradually decreases. As another example, when the iodepth is kept at 8, and a 2 k random IO is used, 60% of IO has a latency of 20 us. In still another example involving a 128K random write with 8 iodepth, the latency is 2~50 ms which is very HIGH. As a final example, where the Iodepth is 16 and a 32 k random write has an initial 18% latency, about 2 ms later most of the IO has 250 to 1000 us latency. That is, the latency is reduced at a later point.

Figure 3:
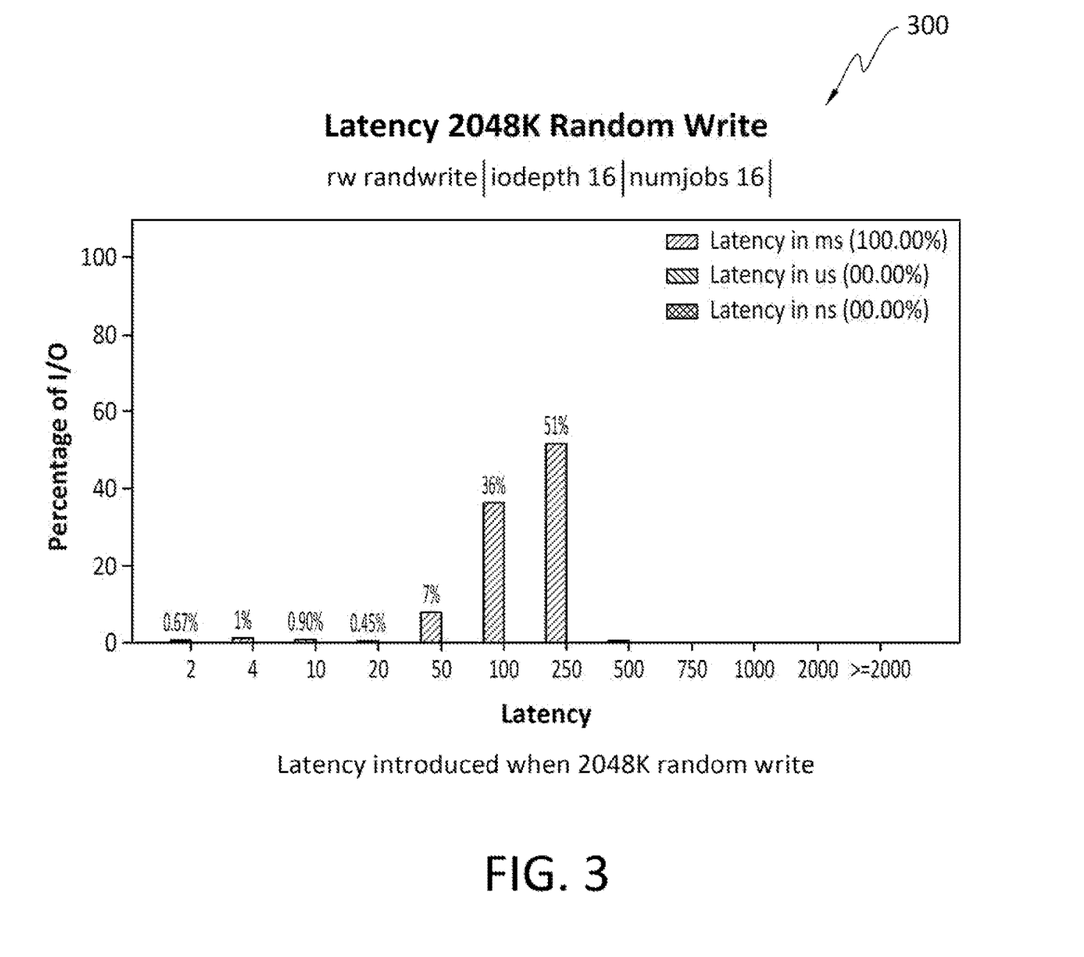
Figure 4:
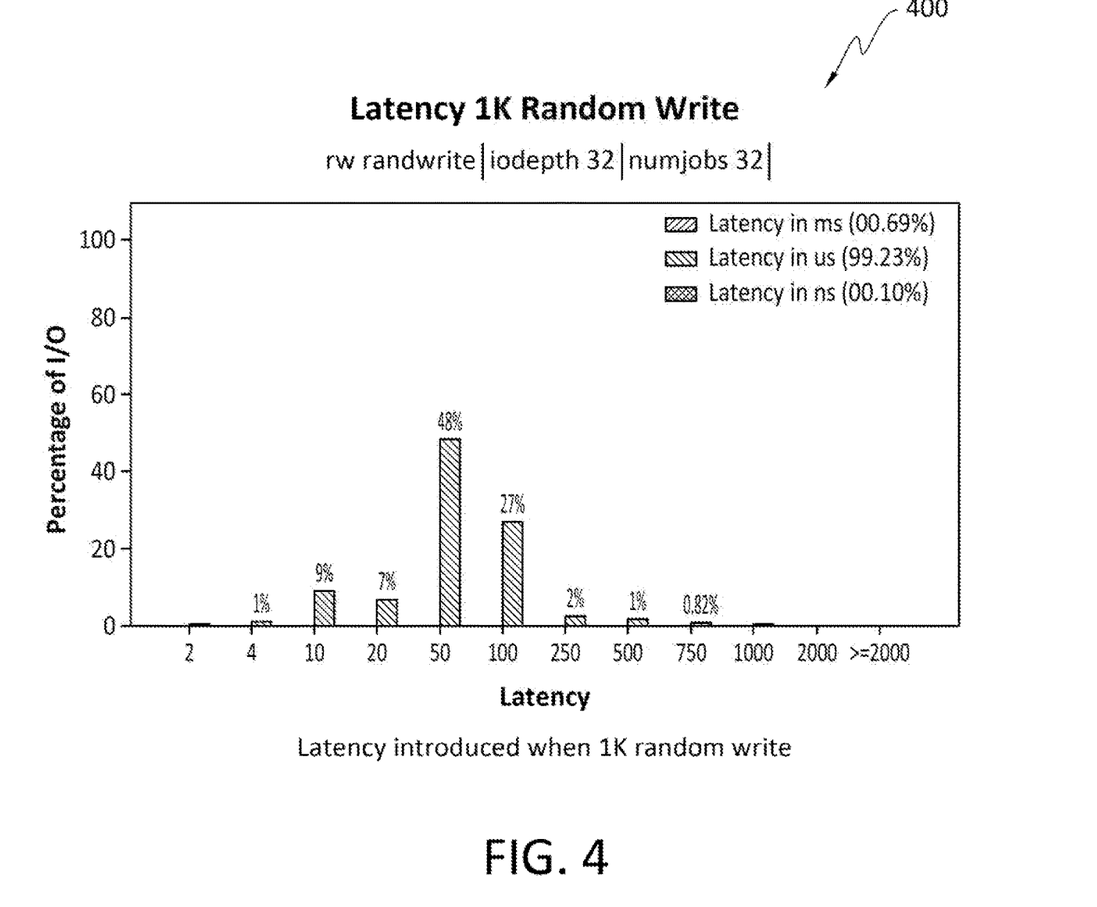
Figure 5:
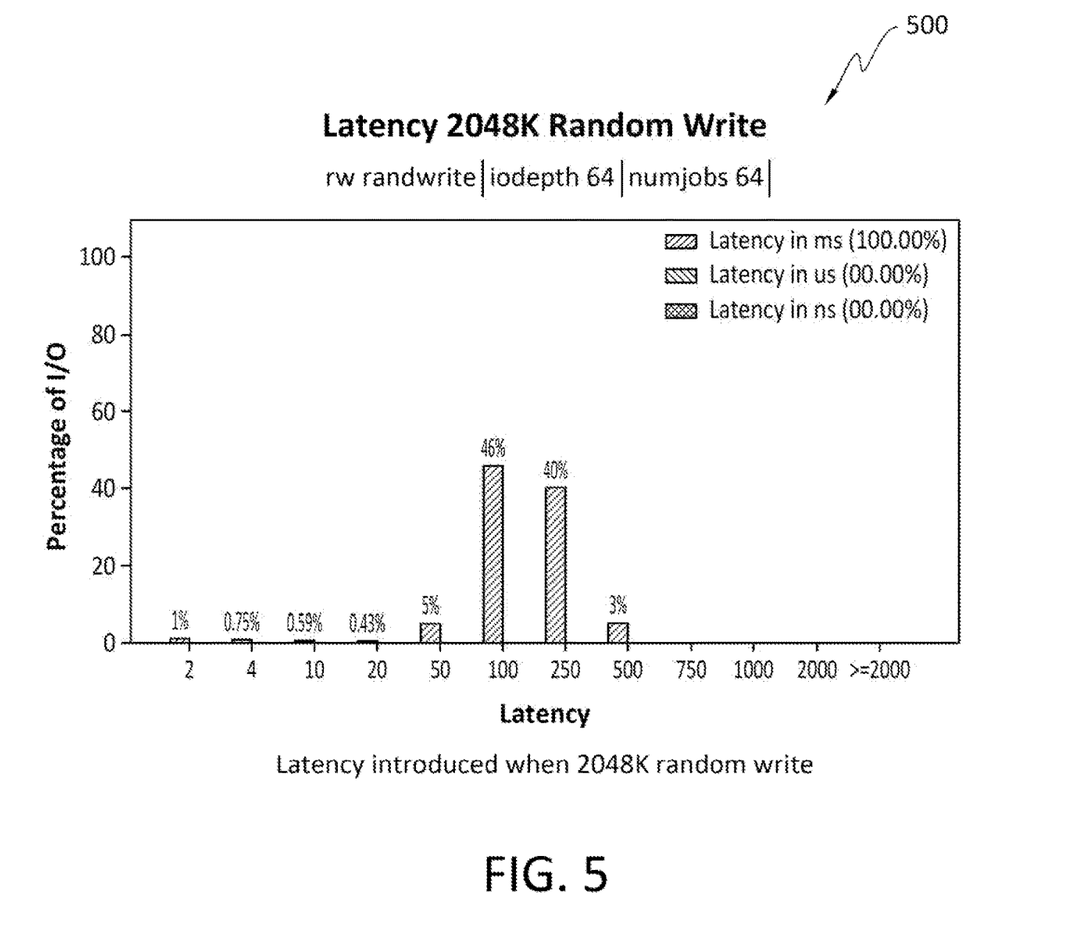

Further example scenarios 200, 300, 400, and 500, respectively, are shown in FIGS. 2-5, where the number of jobs or threads is denoted 'numjobs.' In general, the percentage of the IO having a particular latency is denoted in the legend in the upper right corner of the graph. Thus, in the example of FIG. 2, about half of the IO has a latency that can be measured in ms, while the other half of the IO has a latency that can be measure in μs (microseconds). In the examples of FIGS. 3 and 5, the entire IO has a latency that can be measured in ms, while in the example of FIG. 4, the entire IO has latency that can be measured in μs. As these examples illustrate, the latency may vary during performance of an IO.

C. Example Methods

Figure 6:
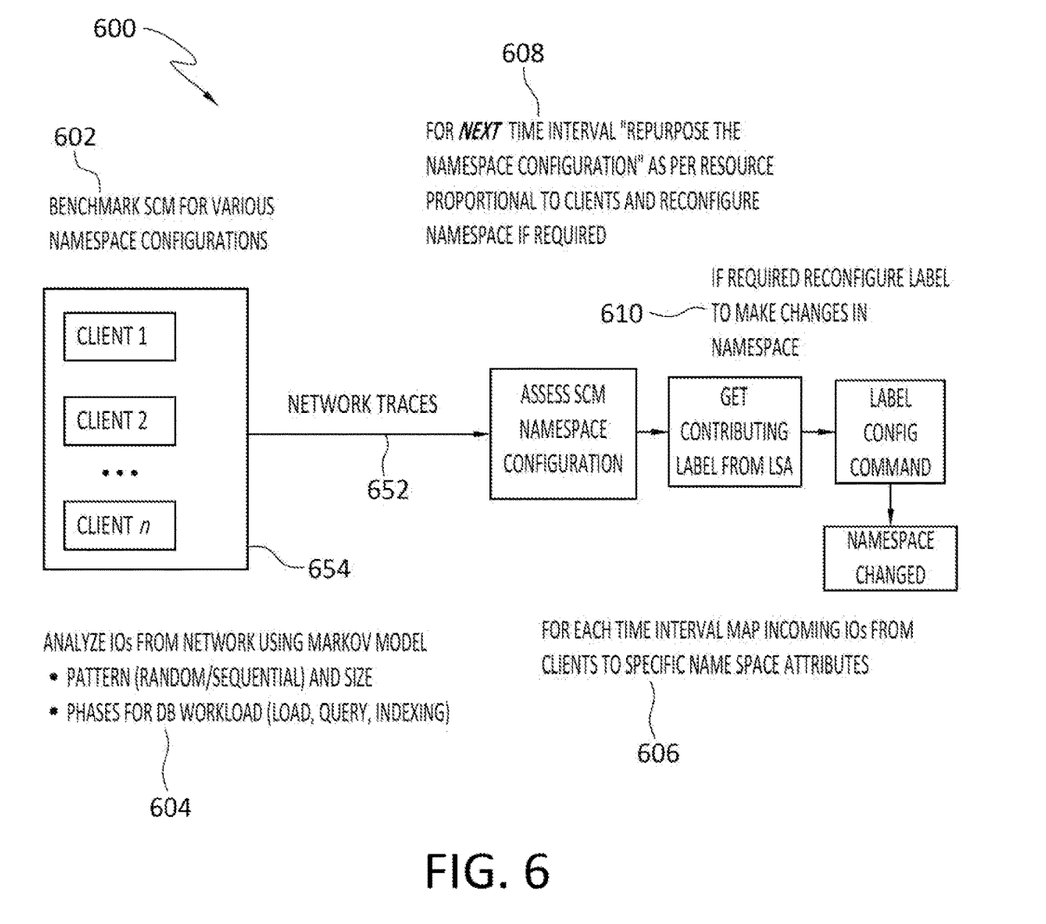
FIG. 6 discloses an example method for configuring an SCM.

It is noted with respect to the example method of FIG. 6 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 6, an example method 600 is disclosed for reconfiguring an SCM. The method 600 may be performed at a data storage site, such as a cloud datacenter for example. The method 600 may be performed by a system such as the DellEMC DataDomain system for example. In other embodiments, the method 600 may be implemented in a stand-alone platform configured to communicate with one or more clients and with a data storage site. More generally however, no particular implementation of the method 600 is required.

Figure 7A:
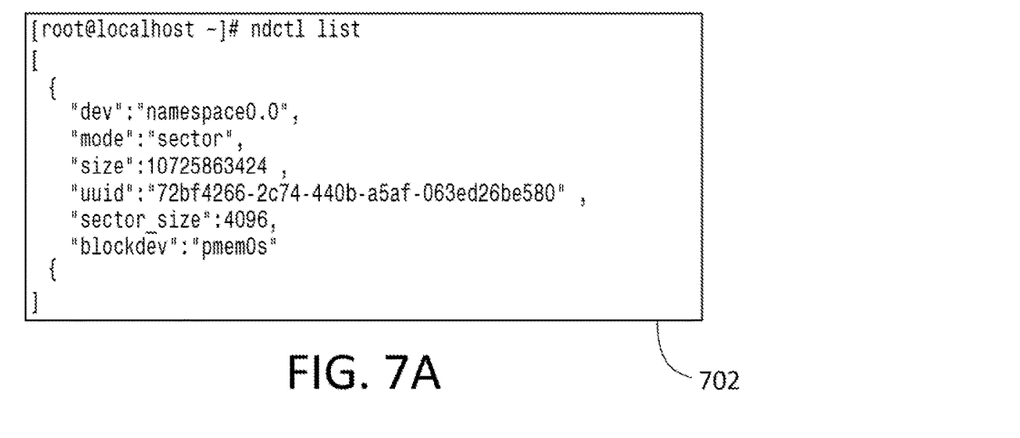
FIGS. 7a and 7b are directed to respective SCM configurations.

In the illustrative example of FIG. 6, the reconfiguration is based on client data resource proportionality, although other bases may be employed for reconfiguring an SCM. In the example of FIG. 6, and directing attention to FIG. 7a as well, the initial configuration 702 of the SCM has a namespace, such as 'namespace0.0' in this example. The namespace indicated in the initial configuration 802 may be an NVM namespace for example, that is configured in 'sector mode,' with a sector size of 4096 bytes, and 10 G of total capacity. As also indicated in FIG. 7a, the initial configuration 702 of the SCM may specify a UUID (universal unique identifier). In general, a namespace may include all the storage or memory addresses embraced by that namespace.

Figure 7B:
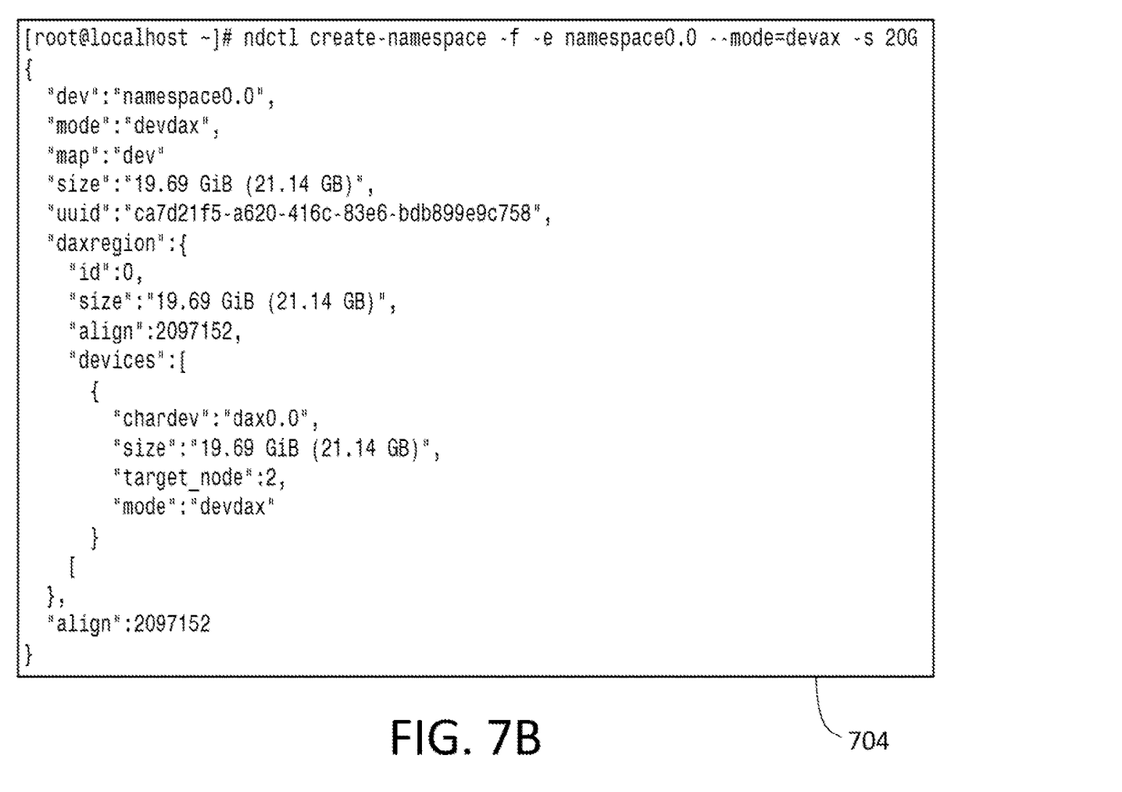

An SCM may have multiple namespaces and, accordingly, the example namespaces discussed in FIGS. 6, 7a, and 7b, are provided only by way of example and the various approaches disclosed in those figures may be applied as well to one or more other namespaces of an SCM. In some embodiments, an SCM may have one or more namespaces for any one or more of the various modes disclosed herein, and/or for other modes. Thus, no particular configuration of a namespace, nor of an SCM, is required by any embodiment.

Modes other than a sector mode may be specified for a namespace, such as a memory mode, a storage mode, or an 'App-Direct' mode, for example. In general, each namespace of an SCM may correspond to, or identify, a respective physical portion of NVM and/or other storage or memory that may be allocated or reserved for use in operations consistent with the corresponding mode, and the namespace may be configured in various different modes, such as the examples noted herein. Correspondingly, each namespace may correspond to a particular type of memory or storage included in the SCM.

With continued reference to FIG. 6, the initial configuration of the SCM may be a default configuration that may be specified by an administrator for example. The SCM may then be benchmarked 602 for various different SCM configurations using SCM benchmarking data gathered, for example, by an FIO.

After benchmarking 602, a stream 652 of IOs may be received from one or more clients 654, such as in connection with operations of the client, which may be an application for example, and the IOs analyzed 604 using an approach such as a Markov model for example. The Markov chain model may be employed in dynamic systems where all states of the system are fully observable, and a hidden Mark model (HMM) may be employed in systems where states of the system may only be partially observable. A Markov transition matrix may be generated that captures the probability that the system will move from one state to another state. Each row of the matrix contains the probabilities that the state of the system will move from the state represented by that row, to the various other states.

More particularly, the Markov model, or other analytical approach, may be used 604 with respect to the IO stream 652, or 'Network traces' in FIG. 6, to determine the existence and nature of any patterns in the incoming IOs, as well as the size of the IOs. Example IO patterns may be a random sequence of IOs, or a non-random sequence of IOs. A Markov, or other, model may also be used 604 to determine the various phases of a DB (database) workload. For example, whether the DB is performing read or write IOs, whether the DB is responding to queries, or whether the DB is performing any indexing processes.

The receipt of the IO stream 652 and the analysis 604 of the IO stream 652 may be performed, for example, at a data storage site, such as a datacenter for example. In some embodiments, this analytical functionality and receipt of the IO stream 652 may be integrated into a system such as the DellEMC DataDomain system for example. In other embodiments, the receipt of the IO stream 652 and the analytical functionality may be implemented in a stand-alone platform configured to communicate with one or more clients 654 and with a data storage site. More generally however, no particular implementation of the analytical functionality is required.

With continued reference to FIG. 6, the network traces 652 may be received over a specified time period or interval. For example, IOs may be collected for analysis during a time interval beginning at T0 and ending at T1. The collected IOs may then be used to assess the SCM namespace configuration. That is, the IOs may be mapped 606, such as on a client basis for example, to specific namespace attributes, that is, mapped to a range of one or more logical addresses in memory or storage included in the SCM.

In a subsequent time interval, for example, from T1 to T2, the namespace configuration may be repurposed 608, or modified, on a proportional basis among clients. That is, 32% of a DRAM may be allocated, in the namespace, to a client whose IOs have been determined to consume 32% of the DRAM capacity. Although shown as occurring between 606 and 610 in FIG. 6, the repurposing operation 608 may be performed, possibly automatically, any time changes to one or more IO parameters, including IO volume, of one or more clients are detected. Thresholds may be set for the parameters to avoid thrashing, that is, to avoid modifying the SCM every time any parameter change, regardless of significance, occurs. Thus, an SCM configuration may only be modified when a change to a parameter meets or exceeds a specified threshold, and/or, only when an IO stream is determined to have a particular pattern, or no pattern.

With continued reference to the example of FIG. 6, an LSA (label storage area) may be accessed to obtain 610 any namespace labels that are implicated by the IOs in the stream 652 of IOs. For example, if an IO is a write operation that writes data to NVM storage of an SCM, the label of the namespace that includes the NVM logical addresses involved in that write operation may be obtained 610. Note that the LSA generally refers to a location in the SCM that controls the labeling of the namespaces.

The label that has been obtained 610 may be retrieved only when there is a need to modify the label. Where necessary, the label may be modified, such as with a 'label config' command, so as to make changes to the namespace to which the label corresponds. For example, modification of the label may cause one or more of the logical addresses of the corresponding namespace to be reallocated for use by an IO stream, or particular client.

For example, and with reference now to FIG. 7b, suppose that at some point in time after the initial configuration of the SCM 702 has been implemented, an IO stream is received that comprises an IO pattern which may be most efficiently written to storage or memory in byte mode. In this case, it may be useful to generate a modified SCM configuration 704. In this particular example, the best write performance may be obtained by bypassing the filesystem, and employing a devdax (device direct access) mode instead in which writes are sent from an application, which may be operating at a client, directly to storage. This devdax mode is denoted 'DAX' in FIG. 7b. Further, as the IOs in this new example IO stream are bigger than the IOs on which the prior SCM configuration was based, there may be a need to allocate more of the storage in SCM to that IO stream and/or to the client that originated the IO stream. FIG. 7b discloses an SCM configuration 704 that may suit these purposes.

As shown in FIG. 7b, the SCM configuration 704 may operate in the 'devdax' mode and have an associated namespace 'namespace0.0.' The size of the namespace in this example is 20 GB, and the SCM configuration may specify a UUID of the SCM. As noted in connection with the example method 600, the SCM configuration 704 may be modified to suit changing parameters of IOs and an IO stream.

Figure 8:
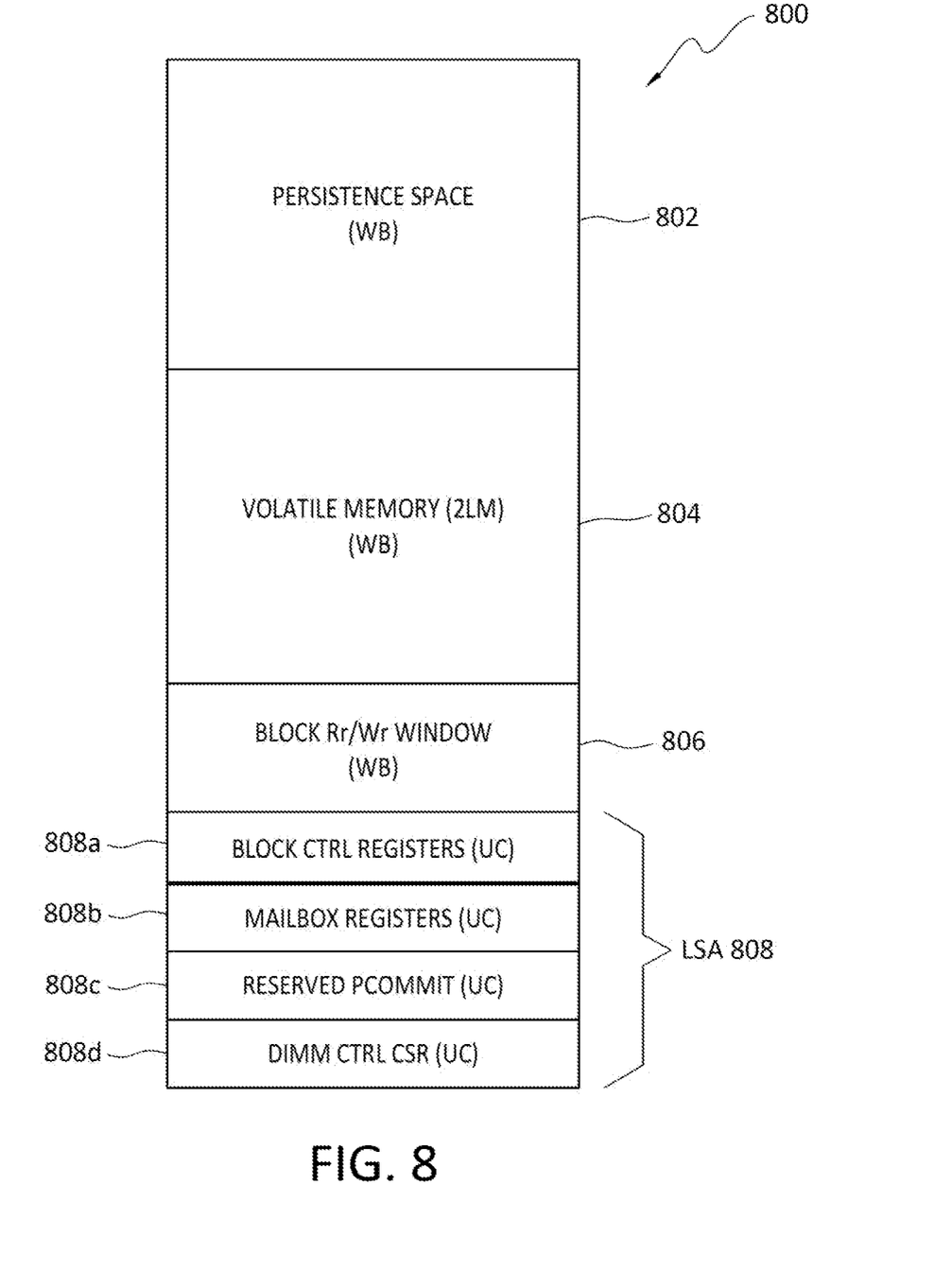
FIG. 8 discloses an example SCM hardware configuration.

With reference now to FIG. 8, aspects of an example SCM 800 are disclosed. In the illustrated example, the SCM 800 includes hardware with different logical sections. The hardware may be configured in volatile memory and nonvolatile memory simultaneously. In particular, the hardware may comprise a persistence memory space 802, which may take the form of WB (writeback cache) memory. The persistence memory space 802 may comprise NVM. Examples of NVM include ROM (read-only memory), and magnetic storage media. The hardware of the SCM 800 may also comprise volatile WB memory 804. The volatile WB memory may be 2LM (2 Level Memory). Examples of volatile memory include DRAM, RAM, and cache memory. Finally, the hardware of the SCM 800 may comprise Block Rr/Wr Window memory 806 with writeback capability.

In some embodiments, the volatile memory, or nonvolatile memory, may be omitted. The respective sizes of the volatile memory and non-volatile memory may be the same, or may be different from each other. More generally, no particular type or combination of memory is required by any embodiment.

As also indicated in FIG. 8, the example SCM 800 may comprise an LSA (Label Storage area) 808 which may serve to control the namespace configuration of the SCM 800. In general, each namespace may have a corresponding LSA. Thus, changes can be made to attributes of the namespace by changing the LSA that corresponds to that namespace. By way of illustration, SCM 800 configuration parameters such as the overall size of the SCM, sector size, block size, and modes, may be configured by the LSA 808. In the illustrated example, the LSA 808 may comprise various elements, including Block Control Registers (Uncacheable (UC)) 808a, Mailbox Registers (UC) 808b, Reserved PCOMMIT (UC) 808c, and DIMM (Dual Inline Memory Module) Ctrl CSR (UC) 808d.

As disclosed herein, embodiments of the invention may provide various functionalities, such as the fine tuning of one or more SCM parameters according to incoming IO pattern so that the IOs can be performed relatively more quickly, which may in turn improve system throughput of IOs. The tuning of SCM parameters may be performed as a non-intrusive method and may be based upon estimates and predictions of the future behavior of IOs based on network traces and performance of statistical methods such as Markov methods. Thus, embodiments may provide for adaptive recommendations as to SCM configuration changes that may produce better IO performance. Further, embodiments may provide for self-reconfiguration of persistent memory namespace characteristics of an SCM, where such reconfiguration may be based in part, or in whole, upon the relative proportions of memory and/or storage resources needed by various clients.

In some particular instances, embodiments of the invention may aid in the performance of ML (Machine Learning) processes, such as performance of ML workloads using HDFS (Hadoop Distributed File System) (large block size). When performing read operation in large chunks, these workloads can be placed on PMem (Persistent Memory) namespaces which adhere to the respective IOPS and latency requirements. Such an approach may optimize the ML performance.

Moreover, commercial entities such as banks and stock trading companies employ SCM for better IO transactions. Embodiment of the invention may be employed to personalize and optimize an SCM configuration for best performance of customer applications. Such optimization may in turn result a relative improvement in customer satisfaction.

D. Further Example Embodiments

Following are some further example embodiments of the invention. These are presented only by way of example and are not intended to limit the scope of the invention in any way.

Embodiment 1. A method, comprising: defining a configuration of SCM; receiving a stream of IOs from a client; analyzing the stream of IOs and, based on the analyzing, estimating future IO behavior of the client; and, based on estimated future IO behavior of the client, reconfiguring one or more parameters of the configuration of the SCM to define an updated configuration of the SCM, and the updated configuration of the SCM enables an improvement in IO performance relative to an IO performance of the configuration of the SCM.

Embodiment 2. The method as recited in embodiment 1, wherein the SCM comprises a namespace and a corresponding Label Storage Area, and the Label Storage Area controls a configuration of the namespace.

Embodiment 3. The method as recited in embodiment 2, wherein the namespace comprises a range of one or more logical addresses in memory or storage of the SCM.

Embodiment 4. The method as recited in any of embodiments 1-3, wherein reconfiguring one or more parameters of the configuration of the SCM comprises changing an amount of SCM memory allocated to the client that generated the IO stream.

Embodiment 5. The method as recited in embodiment 4, wherein changing the amount of SCM memory allocated to the client is performed according to a proportion of SCM memory required by the client relative to SCM memory required by one or more other clients.

Embodiment 6. The method as recited in any of embodiments 1-5, wherein analyzing the stream of IOs comprises analyzing the stream of IOs using a Markov method.

Embodiment 7. The method as recited in any of embodiments 1-6, wherein the IO performance comprises a speed with which one or more IOs are written to memory of the SCM.

Embodiment 8. The method as recited in any of embodiments 1-7, wherein analyzing the stream of IOs comprises identifying any patterns in the stream of IOs and identifying sizes of the IOs.

Embodiment 9. The method as recited in any of embodiments 1-8, further comprising writing one or more IOs to memory of the SCM with the updated configuration.

Embodiment 10. The method as recited in claim 9, wherein the one or more IOs are written according to a mode supported by the SCM.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
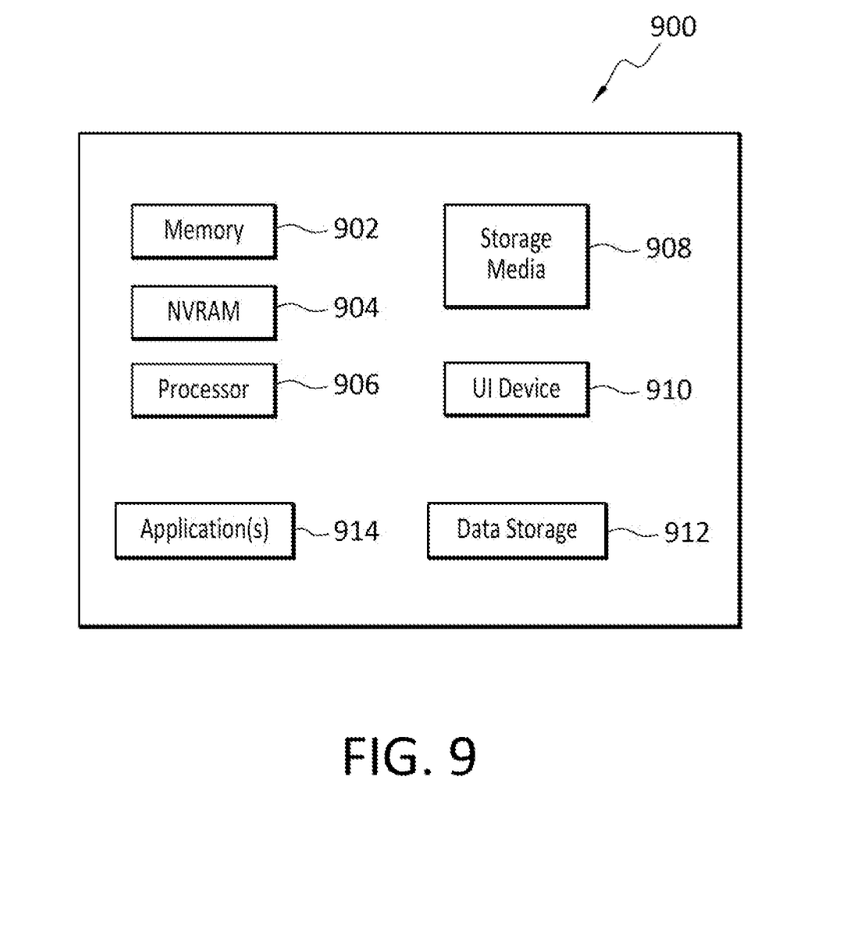
FIG. 9 discloses an example computing entity that is configured to perform any of the disclosed methods and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

defining a configuration of SCM (Storage Class Memory);

receiving a stream of IOs (Input/Output operations) from a client;

analyzing the stream of IOs and, based on the analyzing, estimating future IO behavior of the client; and based on estimated future IO behavior of the client, reconfiguring one or more parameters of the configuration of the SCM to define an updated configuration of the SCM, and the updated configuration of the SCM enables an improvement in IO performance relative to an IO performance of the configuration of the SCM, and wherein reconfiguring the one or more parameters of the configuration of the SCM comprises changing an amount of SCM allocated to the client that generated the IO stream, and changing the amount of SCM is performed according to a proportion of SCM required by the client relative to SCM required by one or more other clients.

2. The method as recited in claim 1, wherein the SCM comprises a namespace and a corresponding Label Storage Area, and the Label Storage Area controls a configuration of the namespace.

3. The method as recited in claim 2, wherein the namespace comprises a range of one or more logical addresses in memory or storage of the SCM.

4. The method as recited in claim 1, wherein an IO parameter is set at a threshold to avoid thrashing of the SCM.

5. The method as recited in claim 1, wherein the analyzing further comprises mapping the IOs to specific namespace attributes.

6. The method as recited in claim 1, wherein analyzing the stream of IOs comprises analyzing the stream of IOs using a Markov method.

7. The method as recited in claim 1, wherein the IO performance comprises a speed with which one or more IOs are written to the SCM.

8. The method as recited in claim 1, wherein analyzing the stream of IOs comprises identifying any patterns in the stream of IOs and identifying sizes of the IOs.

9. The method as recited in claim 1, further comprising writing one or more IOs to the SCM with the updated configuration.

10. The method as recited in claim 9, wherein the one or more IOs are written according to a mode supported by the SCM.

11. A non-transitory storage medium having stored therein instructions that are executable by one or more hardware processors to perform operations comprising:
    defining a configuration of SCM (Storage Class Memory);
    receiving a stream of IOs (Input/Output operations) from a client;
    analyzing the stream of IOs and, based on the analyzing, estimating future IO behavior of the client;
    based on estimated future IO behavior of the client, reconfiguring one or more parameters of the configuration of the SCM to define an updated configuration of the SCM, and the updated configuration of the SCM enables an improvement in IO performance relative to an IO performance of the configuration of the SCM, and
    wherein reconfiguring the one or more parameters of the configuration of the SCM comprises changing an amount of SCM allocated to the client that generated the IO stream, and changing the amount of SCM is performed according to a proportion of SCM required by the client relative to SCM required by one or more other clients.

12. The non-transitory storage medium as recited in claim 11, wherein the SCM comprises a namespace and a corresponding Label Storage Area, and the Label Storage Area controls a configuration of the namespace.

13. The non-transitory storage medium as recited in claim 12, wherein the namespace comprises a range of one or more logical addresses in memory or storage of the SCM.

14. The non-transitory storage medium as recited in claim 11, wherein an IO parameter is set at a threshold to avoid thrashing of the SCM.

15. The non-transitory storage medium as recited in claim 11, wherein the SCM comprises a namespace, and the analyzing further comprises mapping the IOs to specific namespace attributes.

16. The non-transitory storage medium as recited in claim 11, wherein analyzing the stream of IOs comprises analyzing the stream of IOs using a Markov non-transitory storage medium.

17. The non-transitory storage medium as recited in claim 11, wherein the IO performance comprises a speed with which one or more IOs are written to the SCM.

18. The non-transitory storage medium as recited in claim 11, wherein analyzing the stream of IOs comprises identifying any patterns in the stream of IOs and identifying sizes of the IOs.

19. The non-transitory storage medium as recited in claim 11, further comprising writing one or more IOs to the SCM with the updated configuration.

20. The non-transitory storage medium as recited in claim 19, wherein the one or more IOs are written according to a mode supported by the SCM.

* * * * *